US012566351B2

(12) United States Patent
Wang et al.

(10) Patent No.: US 12,566,351 B2
(45) Date of Patent: Mar. 3, 2026

(54) LIQUID CRYSTAL DISPLAY PANEL AND LIQUID CRYSTAL DISPLAY DEVICE

(71) Applicants: Beijing BOE Display Technology Co., Ltd., Beijing (CN); BOE TECHNOLOGY GROUP CO., LTD., Beijing (CN)

(72) Inventors: Feifei Wang, Beijing (CN); Hongming Zhan, Beijing (CN); Yajun Li, Beijing (CN); Yuanhui Guo, Beijing (CN); Yangcan Shen, Beijing (CN); Jiantao Liu, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 43 days.

(21) Appl. No.: 18/701,318

(22) PCT Filed: Mar. 17, 2023

(86) PCT No.: PCT/CN2023/082302

§ 371 (c)(1),
(2) Date: Apr. 15, 2024

(87) PCT Pub. No.: WO2024/192585

PCT Pub. Date: Sep. 26, 2024

(65) Prior Publication Data

US 2025/0258409 A1 Aug. 14, 2025

(51) Int. Cl.

*G02F 1/1343* (2006.01)
*C09K 19/06* (2006.01)
(Continued)

(52) U.S. Cl.

CPC ...... *G02F 1/134318* (2021.01); *C09K 19/068* (2013.01); *C09K 19/12* (2013.01);
(Continued)

(58) Field of Classification Search

CPC ...................................................... C09K 19/12
See application file for complete search history.

(56) References Cited

U.S. PATENT DOCUMENTS

2010/0165223 A1 7/2010 Cho et al.
2016/0342024 A1* 11/2016 Xie .................. G02F 1/133553

FOREIGN PATENT DOCUMENTS

CN 105974677 A 9/2016
CN 109206400 A 1/2019
(Continued)

OTHER PUBLICATIONS

International Search Report of PCT application No. PCT/CN2023/082302 dated Dec. 18, 2023.
(Continued)

*Primary Examiner* — Chanceity N Robinson
(74) *Attorney, Agent, or Firm* — Calfee, Halter & Griswold LLP

(57) ABSTRACT

The provided is a liquid crystal display panel and a liquid crystal display device. The liquid crystal display panel comprises an array substrate (ARR) and a color film substrate (CF) which are cell-assembled, and a liquid crystal layer (LC) disposed between the array substrate (ARR) and the color film (CF) substrate. Wherein the liquid crystal layer (LC) comprises a negative liquid crystal composition; the total mass content of monomers containing dibenzothiophene structure and monomers containing dibenzofuran structure in the negative liquid crystal composition is not more than 2%.

18 Claims, 3 Drawing Sheets

(51) Int. Cl.
*C09K 19/12* (2006.01)
*C09K 19/20* (2006.01)
*C09K 19/30* (2006.01)
*G02F 1/1337* (2006.01)

(52) U.S. Cl.
CPC .......... *C09K 19/20* (2013.01); *C09K 19/3003* (2013.01); *G02F 1/133749* (2021.01); *G02F 1/133784* (2013.01); *C09K 2019/123* (2013.01); *C09K 2019/3004* (2013.01); *C09K 2019/301* (2013.01); *C09K 2019/3016* (2013.01)

(56) References Cited

FOREIGN PATENT DOCUMENTS

| | | | | | |
|---|---|---|---|---|---|
| CN | 109370612 | A | | 2/2019 | |
| CN | 110229676 | A | | 9/2019 | |
| CN | 111077709 | A | | 4/2020 | |
| CN | 112980459 | A | | 6/2021 | |
| CN | 112980464 | A | | 6/2021 | |
| CN | 113512428 | A | | 10/2021 | |
| CN | 113652245 | A | | 11/2021 | |
| CN | 114058155 | A | | 2/2022 | |
| CN | 114236913 | A | | 3/2022 | |
| CN | 114437734 | A | | 5/2022 | |
| CN | 115793306 | A | | 3/2023 | |
| CN | 116254121 | A | * | 6/2023 | ............. C09K 19/44 |
| JP | 2023018639 | A | | 2/2023 | |
| KR | 20220115502 | A | | 8/2022 | |

OTHER PUBLICATIONS

Written Opinion of PCT application No. PCT/CN2023/082302 dated Dec. 18, 2023.

* cited by examiner

LIQUID CRYSTAL DISPLAY PANEL AND LIQUID CRYSTAL DISPLAY DEVICE

CROSS-REFERENCE TO RELATED APPLICATION

The present application is based on PCT filing PCT/CN2023/082302, filed Mar. 17, 2023, the entire contents of which are incorporated herein by reference.

TECHNICAL FIELD

The present disclosure relates to the field of display technology, and specifically to a liquid crystal display panel and liquid crystal display device.

BACKGROUND

Large-sized LCD display products (such as 4K/8K televisions) have reached a certain bottleneck in improving transmittance and have higher requirements for display image quality. However, due to limitations in technology and materials, large-sized liquid crystal display products are difficult to simultaneously improve transmittance and reduce residual images. This restricts the quality of large-sized LCD display products.

It should be noted that the information disclosed in the Background section above is only for enhancing the understanding of the background of the present disclosure, and thus may include information that does not constitute prior art known to those of ordinary skill in the art.

SUMMARY

The present disclosure provides a liquid crystal display panel and a liquid crystal display device.

According to an aspect of the present disclosure, there is provided a crystal display panel, including an array substrate and a color film substrate which are cell-assembled, and a liquid crystal layer disposed between the array substrate and the color film substrate;

wherein the liquid crystal layer includes a negative liquid crystal composition; the total mass content of monomers containing dibenzothiophene structure and monomers containing dibenzofuran structure in the negative liquid crystal composition is not more than 2%.

According to an embodiment of the present disclosure, the negative liquid crystal composition does not include monomers containing dibenzothiophene structure or monomers containing dibenzofuran structure.

According to an embodiment of the present disclosure, the mass content of negative monomers in the negative liquid crystal composition is from 35% to 50%.

According to an embodiment of the present disclosure, the negative liquid crystal composition further includes an antioxidant, and the mass content of the antioxidant is from 0.1% to 0.5%.

According to an embodiment of the present disclosure, the negative liquid crystal composition further includes a light stabilizer, and the mass content of the light stabilizer is from 0.1% to 0.5%.

According to an embodiment of the present disclosure, the negative liquid crystal composition includes monomers shown by Chemical Formulae 1 and Chemical Formula 2:

Chemical Formula 1

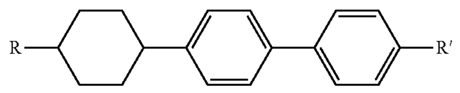

Chemical Formula 2

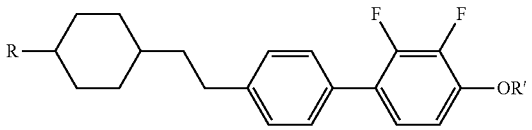

wherein R and R' of any one monomer are each independently selected from alkyl with 1 to 7 carbon atoms, fluorine-substituted alkyl with 1 to 7 carbon atoms, alkenyl with 3 to 10 carbon atoms, oxacycloalkyl with 4 to 10 carbon atoms, alkyl-substituted oxacycloalkyl with 4 to 10 carbon atoms, aryl with 6 to 10 carbon atoms, and alkyl-substituted aryl with 7 to 15 carbon atoms;

wherein the total mass content of the two monomers shown by Chemical Formula 1 and Chemical Formula 2 is from 13% to 20%.

According to an embodiment of the present disclosure, R, R' of any one monomer are each independently selected from methyl, ethyl, propyl, isopropyl, butyl, tert-butyl, isobutyl, pentyl, hexyl, cyclopentyl, cyclohexyl, trifluoromethyl, propen-1-yl, 2-propenyl, 1,2-butadienyl, butylene1-1-yl, 3-buten-1-yl, 3-pentenyl, hexylvinyl, hexylbutenyl, p-tolyl, 1,3-dioxane-2-yl, 5-pentyl-1,3-dioxane-2-yl, 5-butyl-1,3-dioxane-2-yl, 5-(4-propylcyclohexan-1-yl)-1,3-dioxane-2-yl, 5-propyl-1-oxane-2-yl, 5-ethyl-1-oxane-2-yl.

According to an embodiment of the present disclosure, the negative liquid crystal composition includes monomers shown by the following chemical structures:

| Chemical Structure of Monomer | Mass Content of Monomer (%) |
| --- | --- |
| 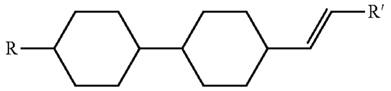 | 35%~45% |
| 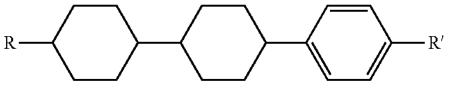 | 8%~14% |

-continued

| Chemical Structure of Monomer | Mass Content of Monomer (%) |
|---|---|
| 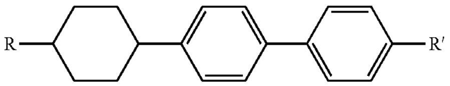 | 4%~8% |
| 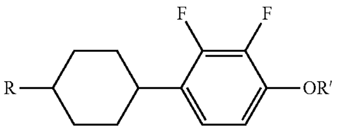 | 14%~23% |
| 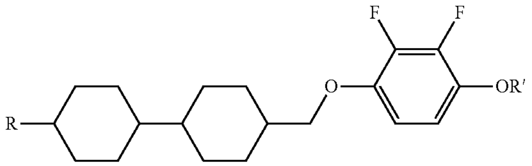 | 10%~18% |
| 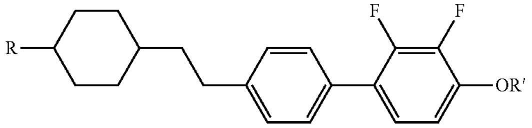 | 5%~13% |

wherein R and R' of any one monomer are each independently selected from alkyl with 1 to 7 carbon atoms, fluorine-substituted alkyl with 1 to 7 carbon atoms, alkenyl with 3 to 10 carbon atoms, oxacycloalkyl with 4 to 10 carbon atoms, alkyl-substituted oxacycloalkyl with 4 to 10 carbon atoms, aryl with 6 to 10 carbon atoms, and alkyl-substituted aryl with 7 to 15 carbon atoms.

According to an embodiment of the present disclosure, the array substrate further includes an alignment layer; the alignment layer includes a first sub-film layer, a second sub-film layer, and a third sub-film layer which are sequentially stacked; the third sub-film layer is disposed adjacent to the liquid crystal layer;

the resistivity of the second sub-film layer is less than the resistivity of the third sub-film layer, and the resistivity of the first sub-film layer is greater than the resistivity of the second sub-film layer.

According to an embodiment of the present disclosure, the first sub-film layer has a resistivity of greater than $10^{15}\Omega\cdot$cm.

According to an embodiment of the present disclosure, the array substrate further includes an alignment layer;

the alignment layer has a pre-tilt angle of no more than 0.68°.

According to an embodiment of the present disclosure, the array substrate further includes an alignment layer; the alignment layer includes a hindered amine light stabilizer.

According to an embodiment of the present disclosure, the array substrate further includes an alignment layer; the surface of the alignment layer is provided with alignment grooves for constraining the alignment direction of the liquid crystals.

According to an embodiment of the present disclosure, the array substrate and the color film substrate are respectively provided with alignment layers. The alignment layer of the array substrate is formed by rubbing alignment with a cotton cloth. The alignment layer of the color film substrate is formed by rubbing alignment with a nylon cloth.

According to an embodiment of the present disclosure, the array substrate includes a base substrate, a first electrode layer, an insulating layer, and a second electrode layer which are sequentially stacked;

wherein the first electrode layer is provided with a lower electrode and the second electrode layer is provided with an upper electrode matching with the lower electrode; one of the upper electrode and the lower electrode is a pixel electrode and the other is a common electrode;

the upper electrode is a slit electrode.

According to an embodiment of the present disclosure, the upper electrode includes a first connecting sub-electrode, a second connecting sub-electrode and a plurality of electrode strips disposed in parallel;

the plurality of electrode strips includes a plurality of first electrode strips, at least one second electrode strip and a plurality of third electrode strips sequentially disposed in the column direction; the first connecting sub-electrode and the second connecting sub-electrode are respectively disposed on both sides of the upper electrode in the row direction;

wherein one end of each the first electrode strip and one end of each the second electrode strip are connected to the first connecting sub-electrode; one end of each the third electrode strip and the other end of each the second electrode strip are connected to the second connecting sub-electrode.

According to an embodiment of the present disclosure, the array substrate further includes data routings extending in the column direction; the first connecting sub-electrode is disposed in parallel with the adjacent data routing; the second connecting sub-electrode is disposed in parallel with the adjacent data routing.

According to an embodiment of the present disclosure, the upper electrode is a pixel electrode and the lower electrode is a common electrode;

the orthographic projection of the pixel electrode on the base substrate is located within the orthographic projection of the common electrode on the base substrate.

According to another aspect of the present disclosure, there is provided a liquid crystal display device comprising the liquid crystal display panels as described above.

It should be understood that the above general description above and the following detailed descriptions merely exemplary and explanatory and should not be construed as limiting of the disclosure.

BRIEF DESCRIPTION OF THE DRAWINGS

The drawings here are incorporated into the specification and constitute a part of the specification, show embodiments in consistent with the present disclosure, and are used together with the specification to explain principles of the present disclosure. Obviously, the drawings in the following description are only some embodiments of the present disclosure. For those of ordinary skill in the art, other drawings can be obtained based on these drawings without creative work.

DETAILED DESCRIPTION

Figure 1:
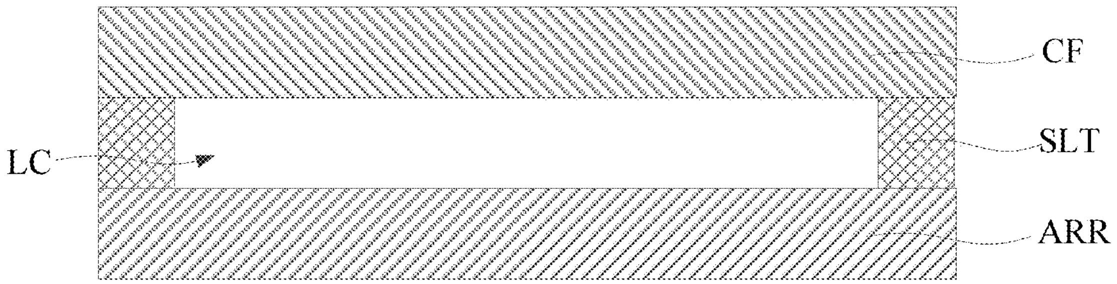
FIG. 1 is a schematic diagram of a structure of a liquid crystal display panel in an embodiment of the present disclosure.

Example embodiments will now be described more fully with reference to the accompanying drawings. However, the example embodiments can be implemented in various forms, and should not be construed as being limited to the embodiments set forth herein. On the contrary, these embodiments are provided so that the disclosure will be comprehensive and complete, and fully convey the concept of the example embodiments to those skilled in the art. The same reference numerals in the figures indicate the same or similar structures, and thus their detailed descriptions will be omitted. In addition, the drawings are only schematic illustrations of the disclosure, and are not necessarily drawn to scale.

Although the relative terms such as "above" and "below" are used in the specification to describe the relative relationship of one component to another component shown, these terms are only for convenience in this specification, for example, according to an example direction shown in the drawings. It will be understood that if the device shown is flipped upside down, the component described as "above" will become a component "below" another component. When a structure is "on" another structure, it may mean that a structure is integrally formed on another structure, or that a structure is "directly" disposed on another structure, or that a structure is "indirectly" disposed on another structure through other structures.

The terms "one", "a", "the", "said", and "at least one" are used to indicate that there are one or more elements/components or the like; the terms "include" and "have" are used to indicate an open meaning of including and means that there may be additional elements/components/etc. in addition to the listed elements/components/etc.; the terms "first", "second" and "third" etc. are used only as markers, and do not limit the number of objects.

The structural layer A is located on the side of the structural layer B away from the base substrate, which can be understood as the structural layer A is formed on the side of the structural layer B away from the base substrate. When the structural layer B is a patterned structure, part of the structure of structural layer A may also be located at the same physical height of the structural layer B or at a lower physical height than the structural layer B, wherein the base substrate is the height reference.

The improvement of transmittance rate is of great significance to the quality improvement of large-size LCD products. Among them, one possible route is to use negative liquid crystals for large-size LCD products, which can increase the transmittance of the products. However, in the current alignment process of LCD products, due to the size constraints of optical alignment equipment, it is not possible to perform optical alignment on large-sized products (which require higher generation production lines). This makes it currently only possible to use the rubbing process to prepare the alignment layer. However, in related technologies, when the alignment layer prepared by rubbing alignment process is used in combination with negative liquid crystals, it is very easy to produce residual images, greatly reducing the display quality of liquid crystal display products.

An embodiment of the present disclosure provides a liquid crystal display panel that uses negative liquid crystals to improve light transmittance while reducing or eliminating residual images, so as to improve the overall display quality of the liquid crystal display panel. It can be understood that the liquid crystal display panel may be a large-sized liquid crystal display panel, such as a liquid crystal display panel of 40 inches or more, and in particular, a liquid crystal display panel of 80 inches or more. The liquid crystal display panel can also be a small-sized display panel, such as a display panel for a cell phone screen or a display panel for a tablet PC, especially for liquid crystal display panels that can be cut through higher generation production lines.

Referring to FIG. 1, the liquid crystal display panel includes an array substrate ARR and a color film substrate CF which are cell-assembled, and includes a liquid crystal layer LC disposed between the array substrate ARR and the color film substrate CF. In some examples, a sealing layer SLT surrounding the liquid crystal layer may also be provided between the array substrate ARR and the color film substrate CF, and the sealing layer SLT, together with the array substrate ARR and the color film substrate CF, surrounds a liquid crystal box for holding the liquid crystal layer LC. Optionally, the material of the sealing layer SLT can be frame sealant.

In the embodiment, the liquid crystal layer LC includes a negative liquid crystal composition. The total mass content of monomers containing dibenzothiophene structure and monomers containing dibenzofuran structure in the negative liquid crystal composition is not more than 2%. The use of a negative liquid crystal composition for the liquid crystal layer improves the transmittance of the liquid crystal display panel and eliminates or significantly reduces the residual image compared to the use of a positive liquid crystal composition for the liquid crystal layer.

It can be understood that when positive liquid crystal molecules are charged, the long axes of the molecules are aligned along the direction of the electric field; when negative liquid crystal molecules are charged, the long axes of the molecules are aligned perpendicular to the direction of the electric field. In the area where the horizontal electric field (the horizontal electric field is defined as the electric field parallel to the plane where the array substrate is located) is weak in the area of pixel electrodes, such as in the middle area of the slit, the negative liquid crystal molecules are aligned more regularly than the positive liquid crystal molecules, which makes it possible to improve the transmittance rate by using negative liquid crystal compositions.

Figure 2:
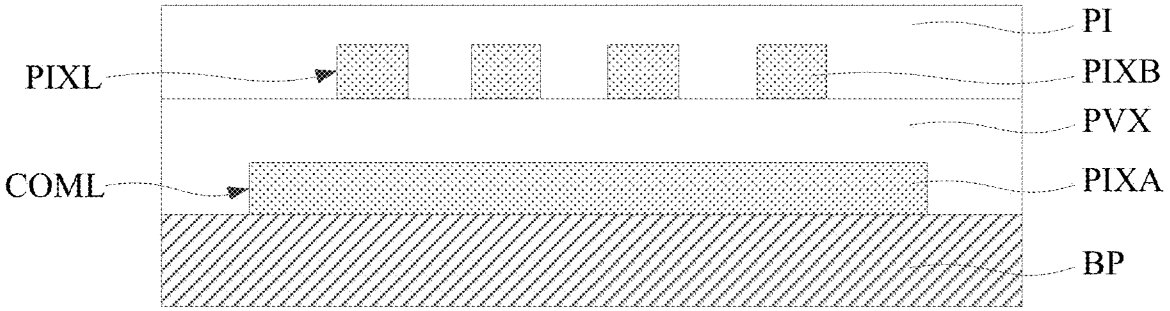
FIG. 2 is a schematic diagram of a partial cross-sectional structure of an array substrate in an embodiment of the present disclosure, in which the upper electrode is a pixel electrode.
Figure 3:
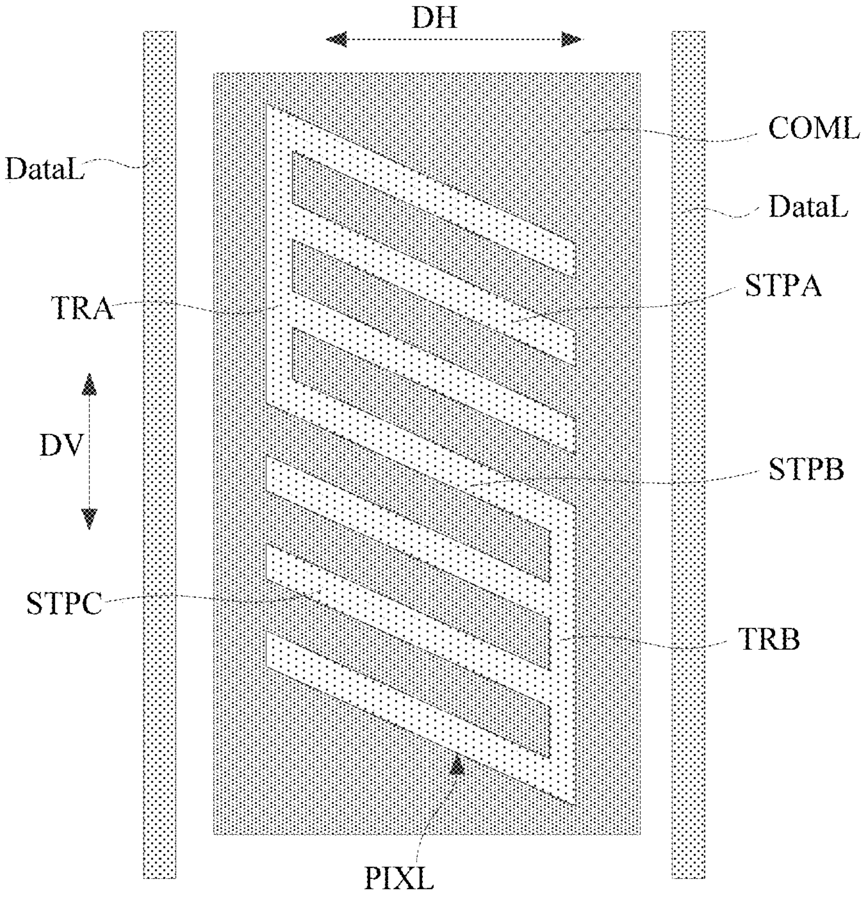
FIG. 3 is a schematic diagram of a partial top view structure of an array substrate in an embodiment of the present disclosure, in which the upper electrode is a pixel electrode.

In an example, the liquid crystal display panel adopts ADS (Advanced Super Dimension Switch) electric field mode. Referring to FIG. 2 and FIG. 3, the array substrate ARR of the liquid crystal display panel includes a pixel electrode PIXL and a common electrode COML, and a fringing electric field is generated between the pixel electrode PIXL and the common electrode COML. The liquid crystal molecules are tilted or flipped under the control of the fringing electric field, thus realizing the control of the transmittance rate. The fringing electric field has a horizontal (parallel to the plane where the liquid crystal display panel is located) component and a vertical (parallel to the normal line of the liquid crystal display panel) component. For positive liquid crystal compositions, the vertical component of the fringing electric field causes the liquid crystal molecules to be tilted, resulting in irregular alignment of the positive liquid crystal molecules, and reducing the luminous efficiency of liquid crystals. For negative liquid crystal compositions, the vertical component of the electric field has no effect, and has little effect on the alignment of the negative liquid crystal molecules, which is beneficial for improving the transmittance of liquid crystal display panels. In other words, the maximum brightness of the liquid crystal display panel is improved compared to the liquid crystal product using positive liquid crystal compositions; similarly, when displaying the same gray scale, the liquid crystal display panel is also higher. In some examples, it has been demonstrated that compared to using a positive liquid crystal composition, the liquid crystal display panel of the present disclosure can increase the transmittance by 4.6% to 6.5% when using a negative liquid crystal composition.

In addition, the use of negative liquid crystal compositions for the liquid crystal layer can also improve the contrast of the liquid crystal display panel compared to the use of positive liquid crystal compositions for the liquid crystal layer, thereby further improving the display quality of the liquid crystal display panel. When displaying a black screen (a screen with a gray scale of 0, L0), if a positive liquid crystal composition is used in the liquid crystal display panel, the vertical component of the fringing electric field causes the positive liquid crystal molecules to tilt, resulting in higher brightness. In the embodiment of the present disclosure, however, the vertical component of the fringing electric field has no effect on the negative liquid crystal molecules, and the negative liquid crystal molecules are aligned so as to reduce the brightness. As a result, the liquid crystal display panel has a higher brightness when displaying a non-black screen and a lower brightness when displaying a black screen, ultimately higher contrast.

In an embodiment of the present disclosure, the array substrate is provided with pixel units distributed in an array, and the pixel unit includes a pixel electrode PIXL, a common electrode COML corresponding to the pixel electrode PIXL, and a pixel drive circuit (e.g., a thin film transistor) driving the pixel electrode PIXL. The array substrate may also include a scanning routing for loading a scanning signal to the pixel drive circuit and a data routing DataL for loading a drive voltage to the pixel drive circuit. Each scanning routing and each data routing defines a plurality of pixel areas, with pixel electrodes and common electrodes set within the pixel area. Under the control of the scanning signal, the pixel drive circuit can load the drive voltage loaded on the scanning routing to the pixel electrodes, thereby controlling the deflection of liquid crystals on the pixel areas corresponding to the pixel electrodes. In the embodiment of the present disclosure, for the sake of convenience, the direction in which the scanning routing extends is referred to as the row direction DH, and the direction in which the data routing extends is referred to as the column direction DV. In an example, the row direction is perpendicular to the column direction. In an example, the array substrate may be provided with a gate layer and a source-drain metal layer; the scanning routing may be disposed in the gate layer and the data alignment may be disposed in the source-drain metal layer.

In an embodiment of the present disclosure, see FIG. 2, the liquid crystal display panel further includes an alignment layer PI. In an example, the alignment direction of the alignment layer is substantially parallel to the column direction of the array substrate. For example, the angle between the alignment direction of the alignment layer and the column direction of the array substrate ARR should not exceed 10°. In this way, from the perspective of the left and right (both sides of the row direction), the difference in the state of negative liquid crystal molecules is very small, which causes the left and right color deviation of the liquid crystal display panel very small. It can be understood that in related technologies, the liquid crystal display panel adopts a positive liquid crystal composition and the alignment direction of the alignment layer is substantially parallel to the row direction of the array substrate, which causes a significant difference in the liquid crystal molecules from the left and right perspectives, leading to a large color deviation of the liquid crystal display panel. Thus, compared to the related technology, the crystal display panel of the embodiment can also reduce the left and right color deviation of the liquid crystal display panel, further improving the display quality of the liquid crystal display panel.

In the liquid crystal display panel of an embodiment of the present disclosure, the negative liquid crystal composition contains no more than 2% by mass of monomers containing dibenzothiophene structure and monomers containing dibenzofuran structure, and in particular may be no more than 1%, and preferably no more than 0.5% by mass. In an example, the negative liquid crystal composition does not include monomers containing dibenzothiophene structure or monomers containing dibenzofuran structure. This can significantly reduce the residual image grade or eliminate the residual image.

The residual image is an important criterion for evaluating the quality of the display, which refers to the phenomenon where a display panel lights up for a period of time before switching between images, and the previous image does not disappear quickly, but still partially visible and superimposed on the next image. The residual image causes overlapping of images, resulting in abnormal display. In analyzing the problem of residual images caused by negative liquid crystals, the inventors found that an important reason for the occurrence of residual images is that when one image is left for too long, the charged ion impurities in the liquid crystal cartridge move near the electrodes (e.g., pixel electrodes or common electrodes), forming a built-in electric field opposite to the drive voltage. When the next image is displayed, the ions do not dissipate immediately, affecting the normal alignment of the liquid crystal molecules in the next image. Compared to positive liquid crystal molecules, negative liquid crystal monomers have a higher electron cloud density and a higher proportion of polar monomers, which can easily adsorb ions in negative liquid crystal compositions, leading to a decrease in voltage maintenance and the generation of residual images. However, in related technologies, monomers with high negativity (negative and high polarity), high refractive index, and dibenzothiophene or dibenzofuran structures are usually added to negative liquid crystal compositions to ensure that the negative liquid crystal composition has a small response time. The inventors found that liquid crystal monomers having a dibenzothiophene structure or a dibenzofuran structure are not sufficiently stable, and that impurity ions are generated upon aging and decomposition thereof, and that these impurity ions cause residual images to be generated and exacerbated, and even make liquid crystal display panels defective in terms of staining.

In response to this discovery, the inventors proposed a technical solution to reduce the unstable structure in the negative liquid crystal composition, specifically, so that the total mass content of monomers containing dibenzothiophene structure and monomers containing dibenzofuran structure in the negative liquid crystal composition is not more than 2%. In the demonstration test, it was found that this can significantly improve the residual image of the liquid crystal display panel.

Furthermore, one or more liquid crystal monomers with medium negativity (negative and medium polarity) and high refractive index can be added to the negative liquid crystal composition to compensate for the material properties of the negative liquid crystal composition, offsetting the changes in material properties caused by the decrease or removal of monomers containing dibenzothiophene and dibenzofuran structures. This can prevent significant changes in the overall properties of the negative liquid crystal composition, such as maintaining a lower response time, at least one or all of the similar ne (abnormal refractive index), no (normal refractive index), and the like. In the embodiment of the disclosure, Δn (ne−n0)>0.12 is used as a criterion for large refractive index of a liquid crystal monomer or liquid crystal composition.

In an embodiment of the present disclosure, the mass content of negative monomers in the negative liquid crystal composition is from 35% to 50%. In this way, these negative monomers can make the negative liquid crystal compositions suitably negative, so that the electric field response properties of the negative liquid crystal compositions can meet the requirements.

In an embodiment of the present disclosure, the negative liquid crystal composition includes two monomers shown by Chemical Formula 1 and Chemical Formula 2:

Chemical Formula 1

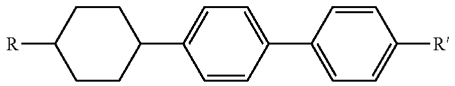

Chemical Formula 2

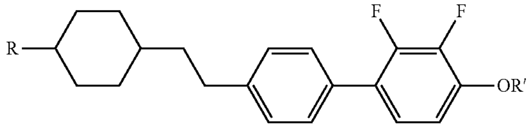

wherein R and R' of any one monomer are each independently selected from alkyl with 1 to 7 carbon atoms, fluorine-substituted alkyl with 1 to 7 carbon atoms, alkenyl with 3 to 10 carbon atoms, oxacycloalkyl with 4 to 10 carbon atoms, alkyl-substituted oxacycloalkyl with 4 to 10 carbon atoms, aryl with 6 to 10 carbon atoms, and alkyl-substituted aryl with 7 to 15 carbon atoms.

For example, the R and R' of any monomer are independently selected from methyl, ethyl, propyl, isopropyl, butyl, tert-butyl, isobutyl, pentyl, hexyl, cyclopentyl, cyclohexyl, trifluoromethyl, propen-1-yl, 2-propenyl, 1,2-butadienyl, butylene1-1-yl, 3-buten-1-yl, 3-pentenyl, hexylvinyl, hexylbutenyl, p-tolyl, 1,3-dioxane-2-yl, 5-pentyl-1,3-dioxane-2-yl, 5-butyl-1,3-dioxane-2-yl, 5-(4-propylcyclohexan-1-yl)-1,3-dioxane-2-yl, 5-propyl-1-oxane-2-yl, 5-ethyl-1-oxane-2-yl.

Furthermore, the total mass content of the two monomers mentioned above is from 13% to 20%.

Both of these liquid crystal monomers have a high refractive index, which can result in negative liquid crystal compositions having a high refractive index. In addition,

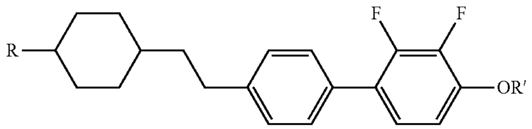

also has a moderately high polarity, which can maintain the polarity of the negative liquid crystal composition at a strong level, thereby ensuring that the negative liquid crystal mixture has appropriate electric field response properties. At the same time, the polarity of the two monomers is not too strong, which avoids too much polarity and easy adsorption of ions in the negative liquid crystal composition, and thus facilitates the reduction of the residual image.

In an embodiment of the present disclosure, the negative liquid crystal composition includes monomers shown by the following chemical structures:

| Chemical Structure of Monomer | Mass Content of Monomer (%) |
|---|---|
| 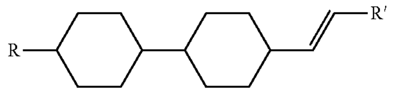 | 35%~45% |
| 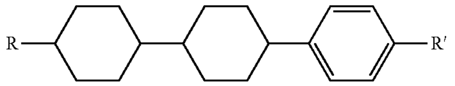 | 8%~14% |
| 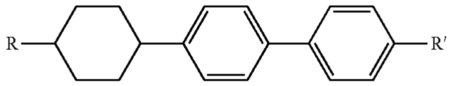 | 4%~8% |
| 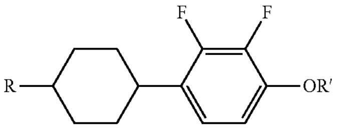 | 14%~23% |
| 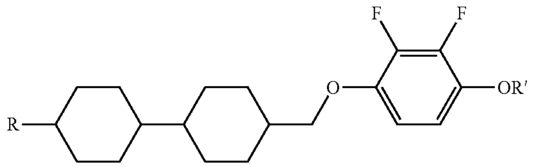 | 10%~18% |
| 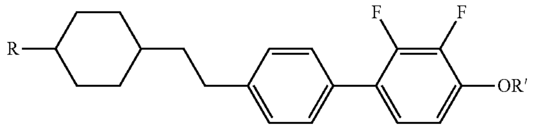 | 5%~13% |

Wherein R and R' of any one monomer are each independently selected from alkyl with 1 to 7 carbon atoms, fluorine-substituted alkyl with 1 to 7 carbon atoms, alkenyl with 3 to 10 carbon atoms, oxacycloalkyl with 4 to 10 carbon atoms, alkyl-substituted oxacycloalkyl with 4 to 10 carbon atoms, aryl with 6 to 10 carbon atoms, and alkyl-substituted aryl with 7 to 15 carbon atoms.

For example, the R and R' of any monomer are independently selected from methyl, ethyl, propyl, isopropyl, butyl, tert-butyl, isobutyl, pentyl, hexyl, cyclopentyl, cyclohexyl, trifluoromethyl, propen-1-yl, 2-propenyl, 1,2-butadienyl, butylene1-1-yl, 3-buten-1-yl, 3-pentenyl, hexylvinyl, hexylbutenyl, p-tolyl, 1,3-dioxane-2-yl, 5-pentyl-1,3-dioxane-2-yl, 5-butyl-1,3-dioxane-2-yl, 5-(4-propylcyclohexan-1-yl)-1,3-dioxane-2-yl, 5-propyl-1-oxane-2-yl, 5-ethyl-1-oxane-2-yl.

In the monomers of the negative liquid crystal composition exemplified above, additives in the negative liquid crystal composition are not exemplified, e.g., antioxidants, light stabilizers, and the like.

As follows, the embodiment of the present disclosure disclose three different negative liquid crystal compositions (a first liquid crystal composition LCA, a second liquid crystal composition LCB, and a third liquid crystal composition LCC) as a demonstration negative liquid crystal composition and a control negative liquid crystal composition.

Wherein the monomers of the first liquid crystal composition LCA and the mass content of each monomer are as shown in Table 1:

TABLE 1

| Monomer and mass content of the first liquid crystal composition | | |
|---|---|---|
| Chemical Structure of Monomer | Property of Monomer | Mass Content of Monomer (%) |
| 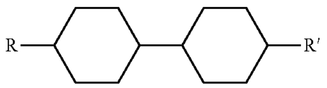 | neutral/low rotational viscosity | 6.1 |
| 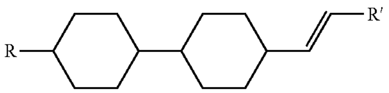 | neutral/low rotational viscosity | 41.7 |

TABLE 1-continued

| Monomer and mass content of the first liquid crystal composition | | |
|---|---|---|
| Chemical Structure of Monomer | Property of Monomer | Mass Content of Monomer (%) |
| 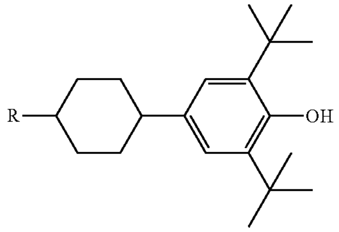 | antioxidant | 0.03 |
| 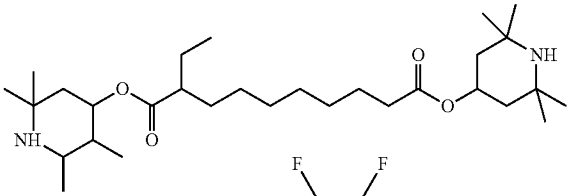 | hindered amine stabilizer | 0.01 |
| 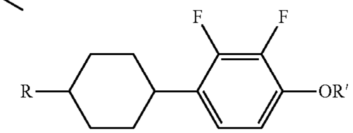 | medium negativity/low rotational viscosity | 8.9 |
| 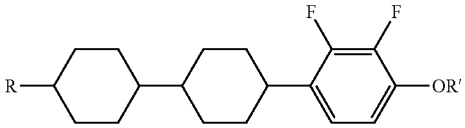 | medium negativity/ high-clearing point | 13.2 |
| 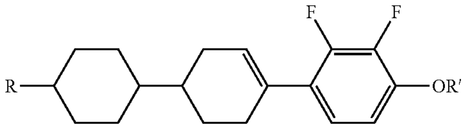 | medium negativity/high refractive index | 23.7 |
| 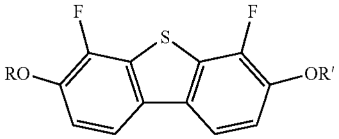 (monomer X) | high negativity/ high refractive index | 6.4 |

The first liquid crystal composition LCA is a control-negative liquid crystal composition having a monomer X. The monomer X contains a dibenzothiophene structure and the mass content of the monomer X in the first liquid crystal composition LCA is 6.4%. In the first liquid crystal composition LCA, the monomer X has a high polarity and a large refractive index, and the other monomers have a lower polarity than the monomer X. The monomer X enables the first liquid crystal composition LCA have a large polarity, a better electric field response property, and a better response time. However, it was found that the monomer X was unstable when subjected to heat, which led to the generation of impurity ions during the preparation of the first liquid crystal composition LCA, which could lead to defective staining and serious residual image problems.

Wherein the monomers of the second liquid crystal composition LCB and the mass content of each monomer are as shown in Table 2:

TABLE 2

| Monomer and mass content of the second liquid crystal composition | | |
|---|---|---|
| Chemical Structure of Monomer | Property of Monomer | Mass Content of Monomer (%) |
| 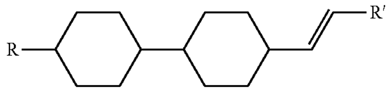 | neutral/low rotational viscosity | 57.6 |

TABLE 2-continued

| Monomer and mass content of the second liquid crystal composition | | |
|---|---|---|
| Chemical Structure of Monomer | Property of Monomer | Mass Content of Monomer (%) |
| 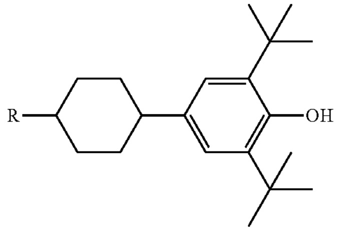 | antioxidant | 0.03 |
| 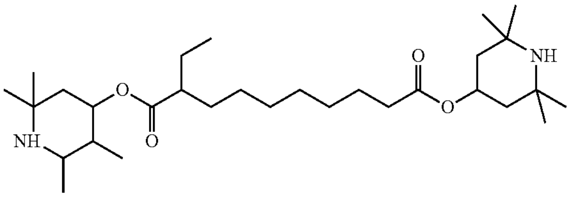 | hindered amine stabilizer | 0.01 |
| 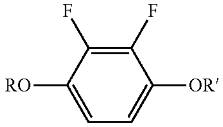 | medium negativity/ low rotational viscosity | 2.9 |
| 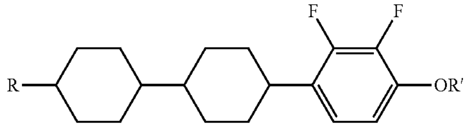 | medium negativity/ high-clearing point | 7.3 |
| 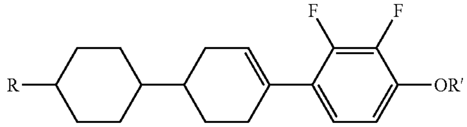 | medium negativity/ high refractive index | 19.0 |
| 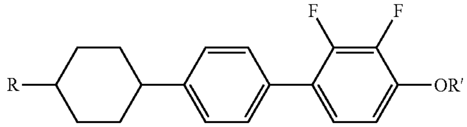 | medium negativity/ high refractive index | 4.7 |
| 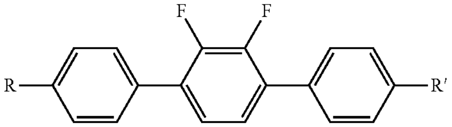 | medium negativity/ high refractive index | 2.7 |
| 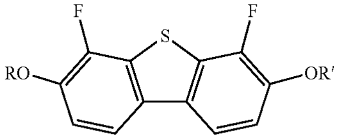 (monomer Y) | high negativity/ high refractive index | 5.9 |

The second liquid crystal composition LCB is a control-negative liquid crystal composition having a monomer Y. The monomer Y contains a dibenzothiophene structure, and its mass content in the second liquid crystal composition LCB is 5.9%. In the second liquid crystal composition, the monomer Y has a high polarity and a large refractive index, and the other monomers have a lower polarity than the monomer Y. The monomer Y enables the second liquid crystal composition LCB have a large polarity, a better electric field response property, and a better response time. However, it was found that the monomer Y was unstable when subjected to heat, which led to the generation of impurity ions during the preparation of the second liquid crystal composition LCB, which could lead to defective staining and serious residual image problems.

Wherein the monomers of the third liquid crystal composition LCC and the mass content of each monomer are as shown in Table 3:

TABLE 3

Monomer and mass content of the third liquid crystal composition

| Chemical Structure of Monomer | Property of Monomer | Mass Content of Monomer (%) |
|---|---|---|
| 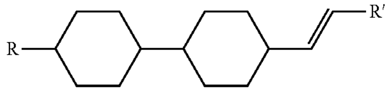 | neutral/ low rotational viscosity | 41.5 |
| 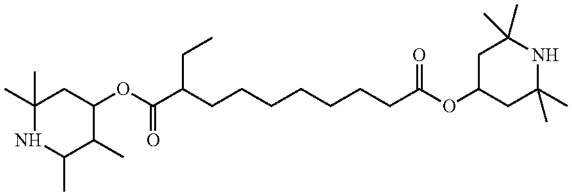 | neutral/ high-clearing point | 11.1 |
| 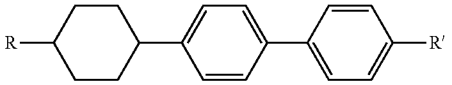 (monomer Y4) | neutral/ high refractive index | 6.2 |
| 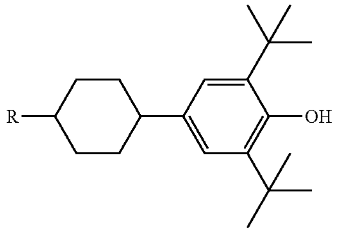 | antioxidant | 0.1 |
| 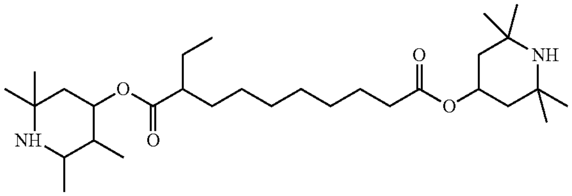 | hindered amine stabilizer | 0.01 |
| 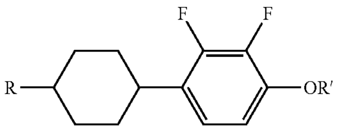 (monomer Y3) | medium negativity/ high-clearing point | 18.5 |
| 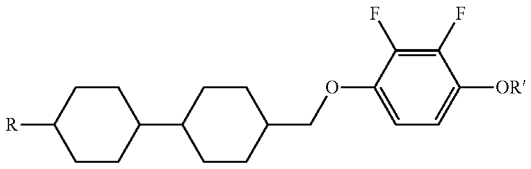 (monomer Y2) | medium negativity/ high refractive index | 14.2 |

TABLE 3-continued

| Monomer and mass content of the third liquid crystal composition | | |
|---|---|---|
| Chemical Structure of Monomer | Property of Monomer | Mass Content of Monomer (%) |
| 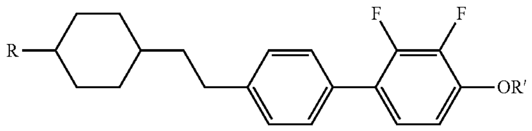 (monomer Y1) | high negativity/ high refractive index | 8.4 |

The third liquid crystal composition LCC does not contain the monomer X or monomer Y, and is a negative liquid crystal composition of an embodiment of the present disclosure as a demonstration negative liquid crystal composition. Each monomer of the third liquid crystal composition LCC does not contain a dibenzothiophene structure or a dibenzofuran structure. Therefore, the third liquid crystal composition LCC is more stable than the first liquid crystal composition LCA and the second liquid crystal composition LCB.

In the first liquid crystal composition LCA and the second liquid crystal composition LCB, the monomer X and monomer Y play an important role in the large polarity of the negative liquid crystal composition. In the third liquid crystal composition LCC, in order to make the negative liquid crystal composition still have a large polarity, three liquid crystal monomers with medium polarity, a monomer Y1, monomer Y2, and monomer Y3, and the like are added. The polarity of these liquid crystal monomers is not too strong, which can reduce the adsorption of ions and improve the residual image; the polarity of these monomers is medium, which can contribute polarity to the third liquid crystal composition LCC and improve the electric field response of the third liquid crystal composition LCC, so that the polarity of the third liquid crystal composition LCC can meet the requirements.

In the first liquid crystal composition LCA and the second liquid crystal composition LCB, the monomer X and monomer Y play an important role in the large refractive index of the negative liquid crystal composition. In the third liquid crystal composition LCC, the monomer Y1 and monomer Y4 are added, and both the monomer Y1 and monomer Y4 have large refractive indices, so that the third liquid crystal composition LCC has a large refractive index.

In other words, the third liquid crystal composition LCC can compensate for the changes in material properties caused by the removal of monomers X and Y by adding new monomers or adjusting the monomer content, so that the material properties of the third liquid crystal composition LCC can still be maintained to meet the requirements.

At the same time, the third liquid crystal composition LCC has better photothermal stability by not using monomers with insufficient stability, and does not cause undesirable staining and residual images under conventional process conditions. After adjusting the various components of the third liquid crystal composition LCC, the third liquid crystal composition LCC has substantially equal electric field response properties as the first liquid crystal combination LCA and the second liquid crystal combination LCB, and the response times are comparable and can meet the requirements.

In each of the monomers shown in Tables 1 to 3 of the present disclosure, R, R' of any one monomer is independently selected from alkyl with 1 to 7 carbon atoms, alkenyl with 3 to 10 carbon atoms, oxacycloalkyl with 4 to 10 carbon atoms, aryl with 6 to 10 carbon atoms, and alkyl-substituted aryl with 7 to 15 carbon atoms.

In Tables 1 to 3 of the present disclosure, the neutral property of a monomer refers to that it is a neutral monomer, which means that the dielectric constant of the monomer is substantially 0. The negativity of a monomer refers to that it is a negative monomer, that is, the dielectric constant of the monomer is less than 0. The medium negativity of a monomer refers to that it is a negative monomer with medium polarity. The high negativity of a monomer refers to that it is a negative monomer with high polarity.

In the embodiment of the present disclosure, the first liquid crystal composition LCA, material properties of the second liquid crystal composition LCB, and the third liquid crystal composition were tested, and the tested results are shown in Table 4:

TABLE 4

| Material parameters of the three liquid crystal compositions Material Parameter (589 nm/25° C.) | | | | | | | | | | | | | |
|---|---|---|---|---|---|---|---|---|---|---|---|---|---|
| | Δn | ne | no | Δε | ε‖ | ε⊥ | Tni/° C. | Tcn/° C. | γ1/ mPa · s | K11/ pN | K22/ pN | K33/ pN | ρ |
| LCA | 0.0916 | 1.5696 | 1.478 | −3.8 | 3.4 | 7.2 | 99 | <−20 | 107 | 17.6 | — | 18.6 | 0.993 |
| LCB | 0.0916 | 1.5714 | 1.4798 | −2.9 | 3.4 | 6.3 | 83.7 | <−20 | 65 | 15 | — | 15.6 | 0.9792 |
| LCC | 0.093 | 1.573 | 1.48 | −2.6 | 3.3 | 5.9 | 81.8 | <−20 | 82 | 15.3 | 8.3 | 17.9 | 0.983 |

Wherein Δn is the optical refractive index anisotropy; Δn=ne−no;

ne is the refractive index along the long axis of the liquid crystal molecule;

no is the refractive index perpendicular to the long axis of the liquid crystal molecule;

Δε is the dielectric anisotropy; Δε=ε‖−ε⊥;

ε|| is the component of dielectric constant along the long axis of the liquid crystal molecule;

ε⊥ is the dielectric constant component perpendicular to the direction of the long axis of the liquid crystal molecule;

Tni is the clearing point;

Tcn is the melting point;

γ1 is the rotational viscosity;

K11 is the splay elastic constant;

K22 is the twist elastic constant;

K33 is the bend elastic constant;

ρ is the density of liquid crystal. According to the material parameters tested in Table 4, it can be seen that the material parameters of the first liquid crystal composition LCA, the second liquid crystal composition LCB, and the third liquid crystal composition LCC are substantially similar or in on the same level. This indicates that the third liquid crystal combination LCC can achieve similar display effects and display quality as the first liquid crystal combination LCA and the second liquid crystal combination LCB when applied to liquid crystal display panels, and can significantly improve residual images.

In an embodiment of the present disclosure, each of the major monomers in the negative liquid crystal composition does not contain an ester group. The inventors have found that the monomers containing ester groups are not sufficiently light stable, especially not sufficiently resistant to ultraviolet light, and are prone to decompose and produce ions, resulting in an aggravation of the residual image. In the embodiment, by avoiding the use of major monomers containing ester groups, it is possible to provide stability and confidence in the negative liquid crystal composition. In the embodiment, the major monomer in the negative liquid crystal composition refers to a monomer with a mass content of not less than 1%.

In an embodiment of the present disclosure, the negative liquid crystal composition may include a s higher mass content of an antioxidant. For example, the mass content of the antioxidant can be no less than 0.1%, for example, within the range of 0.1~0.5%. Furthermore, the mass content of the antioxidant can be within the range of 0.2% to 0.5%. This can improve the photothermal stability of negative liquid crystal compositions and reduce the risk of residual images caused by by-products of aging in negative liquid crystal compositions. In an example, the antioxidant is hinder phenol stabilizer that can achieve an inhibitory effect on free radical polymerization, blocking the oxidative damage of free radicals to monomers in negative liquid crystal compositions.

In an embodiment of the present disclosure, the negative liquid crystal composition may include a higher mass content of a light stabilizer, such as a hindered amine light stabilizer with a higher mass content. For example, the mass content of the hindered amine stabilizer can be no less than 0.03%. Furthermore, the mass content of the light stabilizer should not be less than 0.1%, especially between 0.2% and 0.5%. This can improve the photothermal stability of negative liquid crystal compositions and reduce the risk of residual images caused by oxidation by-products.

In some embodiments of the present disclosure, the liquid crystal display panels further improve the alignment layer to further reduce the risk of residual images.

Figure 4:
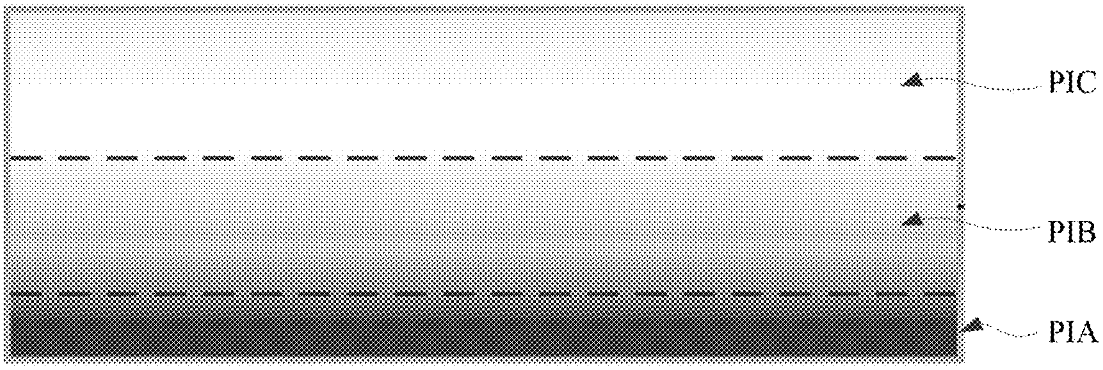
FIG. 4 is a schematic diagram of a structure of an alignment layer in an embodiment of the present disclosure.
Figure 5:
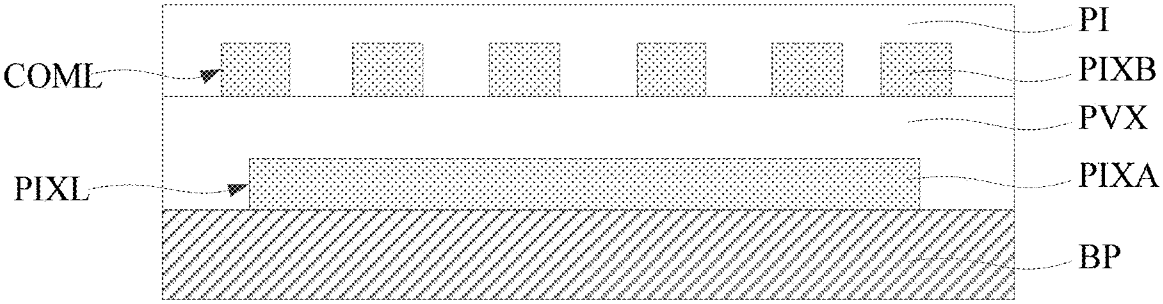
FIG. 5 is a schematic diagram of a partial cross-sectional structure of an array substrate in an embodiment of the present disclosure, in which the upper electrode is a common electrode.

In an embodiment of the present disclosure, see FIG. 4, the alignment layer may include a first sub-film layer PIA, a second sub-film layer PIB, and a third sub-film layer PIC disposed that are sequentially stacked; the third sub-film layer PIC is adjacent to the liquid crystal layer. In other words, the third sub-film layer PIC is disposed on the side of the first sub-film layer PIA away from the pixel electrodes.

The resistivity of the second sub-film layer PIB is less than the resistivity of the third sub-film layer PIC, and the resistivity of the first sub-film layer PIA is greater than the resistivity of the second sub-film layer PIB. In the embodiment, the third sub-film layer PIC is mainly used to provide high alignment force for liquid crystal molecules, reduce the alignment deviation of liquid crystal display panels under AC voltage, and thereby suppress AC (alternating current) residual images. The second sub-film layer PIB has a certain conductivity, which can quickly release residual DC bias caused by DC bias voltage and impurity ions, thereby eliminating DC (direct current) residual images. In the embodiment, the alignment layer is further provided with a first sub-film layer PIA with high resistance, thereby avoiding the accumulation of charges in the second sub-film layer PIB from being transferred to the pixel electrode or common electrode, thereby improving the voltage stability of the pixel electrode and common electrode, enhancing the voltage maintenance rate of the liquid crystal display panel, improving residual images, and avoiding flicker problems caused by a decrease in voltage maintenance rate.

Optionally, the resistivity of the second sub-film layer PIB is less than $10^{14}\Omega\cdot cm$. It can be understood that the smaller the resistivity of the second sub-film layer PIB is, the more effective the alignment layer is in improving the residual image. In an example, the resistivity of the second sub-film layer PIB is not greater than $10^{13}\Omega\cdot cm$. The resistivity of the sub-film layer PIB is not greater than $10^{12}\Omega\cdot cm$. In an example, the resistivity of the second sub-film layer PIB is $10^{12}\Omega\cdot cm$ to $10^{13}\Omega\cdot cm$.

In an example, the resistivity of the third sub-film layer PIC is greater than $10^{15}\Omega\cdot cm$.

In an example, the resistivity of the first sub-film layer PIA is not less than the resistivity of the third sub-film layer PIC. Therefore, the resistivity of the first sub-film layer, PIA, is greater than $10^{15}\Omega\cdot cm$.

In an example, see FIG. 4, the third sub-film layer PIC, the second sub-film layer PIB and the first sub-film layer PIA are three different parts of the same film layer, which are not preceded by strict boundaries or abrupt changes in properties, e.g., sequential gradations and transitions in materials and properties between the two adjacent ones.

For example, in preparing the alignment layer, a alignment material layer may be formed, and then the alignment material layer may be pre-cured to delaminate. After delamination, the alignment material layer is further cured to form the third sub-film layer PIC, the second sub-film layer PIB, and the first sub-film layer PIA. In an example, during the formation of the third sub-film layer PIC, the third sub-film layer PIC can be alignment using linearly-polarized light irradiation to provide the alignment force required for the alignment of the negative liquid crystal composition. In another example, after the third sub-film layer PIC is cured, a rubbing process can be used to form alignment grooves on the surface of the third sub-film layer PIC to provide the negative liquid crystal composition with the necessary alignment force.

In an embodiment of the present disclosure, two different liquid crystal test cells were also prepared and tested, and each of the two liquid crystal test cells had two different alignment layers. One of the liquid crystal test cells is a control liquid crystal test cell, and its alignment layer includes only the third sub-film layer PIC and the second sub-film layer PIB. The other of the liquid crystal test cells is a test liquid crystal test cell, and its alignment layer includes three sub-film layers: the third sub-film layer PIC, the second sub-film layer, PIB, and the first sub-film layer, PIA. Before undergoing the high-temperature aging treatment, the voltage maintenance rate (initial voltage maintenance rate) of the control liquid crystal test cell and the test liquid crystal test cell were substantially the same. Specifically, the initial voltage maintenance rate of the control liquid crystal test cell was 84.7%, and the initial voltage maintenance rate of the test liquid crystal test cell was 84%. After undergoing the high-temperature aging, the voltage maintenance rate (voltage maintenance rate after aging) of the control liquid crystal test cell and the test liquid crystal test cell is measured again. The voltage maintenance rate after aging of the control liquid crystal test cell decreased to 71.6%, which is a significant decrease. The voltage maintenance rate after aging of the test cell decreased to 83.2%, which is only a slight decrease. This shows that providing with the first sub-film layer PIA in the alignment layer can make the voltage maintenance rate of the liquid crystal display panel better maintained, and make the alignment layer have higher heat resistance stability.

It has also been found that, compared to the liquid crystal display panel with the alignment layer provided with only the second sub-film layer PIB and the third sub-film layer PIC, in the embodiment of the present disclosure, the alignment layer is provided with the first sub-film layer PIA, the second sub-film layer PIB, and the third sub-film layer PIC so that residual images can be improved. Specifically, in one test, it was found that the residual image grade of the liquid crystal display panel did not exceed 1.5 when the alignment layer was provided with three layers of the first sub-film layer PIA, the second sub-film layer PIB, and the third sub-film layer PIC, and the residual image grade of the liquid crystal display panel was around 2 when the alignment layer was provided with two layers of the second sub-film layer PIB and the third sub-film layer PIC. In addition, it is also found that the residual image disappearance gray scale of the liquid crystal display panel is improved when the alignment layer was provided with three layers of the first sub-film layer PIA, the second sub-film layer PIB and the third sub-film layer PIC. Specifically, the disappearance gray scale before 10 hours (the screen lasts less than 10 hours) is substantially around 147 gray scales; the disappearance gray scale after 10 hours (the screen lasts more than 10 hours) is substantially around 167 gray scales.

In an embodiment of the present disclosure, the surface of the alignment layer is provided with alignment grooves, which are used to constrain the alignment direction of the liquid crystals. Specifically, a rubbing process may be used to prepare the alignment layer. Especially for large-size display panels and high-generation production lines, this can be free from the size constraints of the optical alignment device. In the embodiment, by improving the negative liquid crystal composition and the alignment layer, the residual image problem in the related technology can be effectively overcome when the two are paired with each other, and it can be used in the high-generation production line. This is to reduce the cost and improve the display quality of liquid crystal display panels, or to provide large-size, high-quality display products.

In an embodiment of the present disclosure, the pre-tilt angle of the alignment layer is not more than 0.68°. This reduces the AC residual image generated by the alignment deviation. In the embodiment, the pre-tilt angle of the alignment layer can be improved by one or more of improving the material of the alignment layer, improving the alignment process, and the like.

For example, the pre-tilt angle can be improved by improving the material of the rubbing cloth used in the alignment process. For example, if the materials of the rubbing cloths are nylon (Rayon) and cotton (Cotton), the pre-tilt angle of the alignment layer is different under the same alignment conditions. For example, the pre-tilt angle can be significantly reduced with cotton (e.g., Cotton 90ic) compared to nylon (e.g., Rayon HY-T116). In one demonstration example, it was found that when RayonHY-T116 was used for alignment, the pre-tilt angle of the alignment layer is 1.10°; when cotton 90ic is used for alignment, the pre-tilt angle of the alignment layer decreases to 0.54°. It can be understood that the pre-tilt angle of the alignment layer can be different when the rubbing cloth material is the same but the material of the alignment layer is different.

In an embodiment of the present disclosure, the material of the alignment layer may also be optimized so that the alignment layer is capable of rapidly releasing the DC bias charge, thereby facilitating the improvement of the DC residual image. For example, the conductivity of the second sub-film layer PIB of the alignment layer, can be adjusted to increase its conductivity to increase the rate of release of the DC bias charge and thus improve the DC residual image.

In an embodiment of the present disclosure, a hindered amine stabilizer can be added to the alignment layer, and the hindered amine stabilizer can bind to the residual reactive groups or generated free radicals in the alignment layer, for example, to form a hydrogen bond, and then attach to the surface of the alignment layer. In this way, the hindered amine stabilizer can prevent the precipitation of ions in the alignment layer, reduce the number of ions free to the negative liquid crystal composition, and thereby improve the defective staining of the liquid crystal display panel and facilitate the improvement of the residual image of the liquid crystal display panel.

In an example, the mass content of the hindered amine stabilizer in the alignment layer can be from 0.005% to 0.5%, especially within the range of 0.03% to 0.1%.

In some embodiments of the present disclosure, the quality control of the alignment layer may also be enhanced to achieve the improvement of residual image. For example, in the production process of alignment layer, cleaning of the alignment layer can be intensified to reduce the precipitation of ions from the alignment layer, thereby reducing the defective staining caused by the precipitation of ions from the alignment layer and improving the residual image caused by the excess of impurity ions in the negative liquid crystal composition.

In some embodiments of the present disclosure, the alignment layer may also be made of UV-resistant material to improve the light stability of the alignment layer, thereby reducing the aging of the alignment layer and precipitating ions to decrease the defective staining and improve the residual image of the liquid crystal display panel.

In some embodiments of the present disclosure, the alignment layer may also include a material having a trapping (TRAP) group to trap free ions, free radicals, and free reactive residues to reduce the free ion content and the aging rate of the alignment layer, thereby reducing the number of ions precipitated from the alignment layer, reducing the defective staining of the liquid crystal display panel, and improving the residual image of the liquid crystal display panel.

In an embodiment of the present disclosure, the quality of the liquid crystal display panel can be further improved, in particular to further reduce the defective staining, through the matching experiment of the negative liquid crystal composition and the alignment layer. Further, in the matching experiment of the negative liquid crystal composition and the alignment layer, the voltage maintenance rate of the test cell can be examined to determine the matching degree of the negative liquid crystal composition and the alignment layer; the more stable the voltage maintenance rate is, the higher the matching degree of the negative liquid crystal composition and the alignment layer is, and the higher the quality of the liquid crystal display panel is.

In an embodiment of the present disclosure, the quality control of the color film substrate CF can be enhanced to achieve the improvement of residual image. For example, in the production process of the color film substrate, cleaning of the color film substrate can be intensified to reduce the precipitation of ions from the color film substrate, thereby reducing the defective staining caused by the precipitation of ions from the color substrate and improving the residual image caused by the excess of impurity ions in the negative liquid crystal composition.

In an embodiment of the present disclosure, the array substrate and the color film substrate are each provided with an alignment layer; the alignment layer of the array substrate is formed by rubbing alignment with a cotton cloth; the alignment layer of the color film substrate is formed by rubbing alignment with a nylon cloth.

In the embodiment, the alignment layer of the array substrate is formed by rubbing alignment with a cotton cloth, which is able to reduce the number of ions generated by the alignment, and the number of ions in the liquid crystal composition, thus reducing the residual image. At the same time, the alignment layer on the side of the color film substrate is formed by rubbing alignment with a nylon cloth, so the alignment layer on the side of the color film substrate has a higher alignment force, which can ensure the alignment strength of the liquid crystal display panel. Therefore, in the embodiment, the liquid crystal display panel can achieve a balance between high alignment strength and low ion quantity, thereby ensuring that the liquid crystal display panel has a high display quality.

In some embodiments of the present disclosure, the liquid crystal display panel of the present disclosure may also improve the light transmission of liquid crystal display panels be operated by optimizing the electrode shape.

Figure 6:
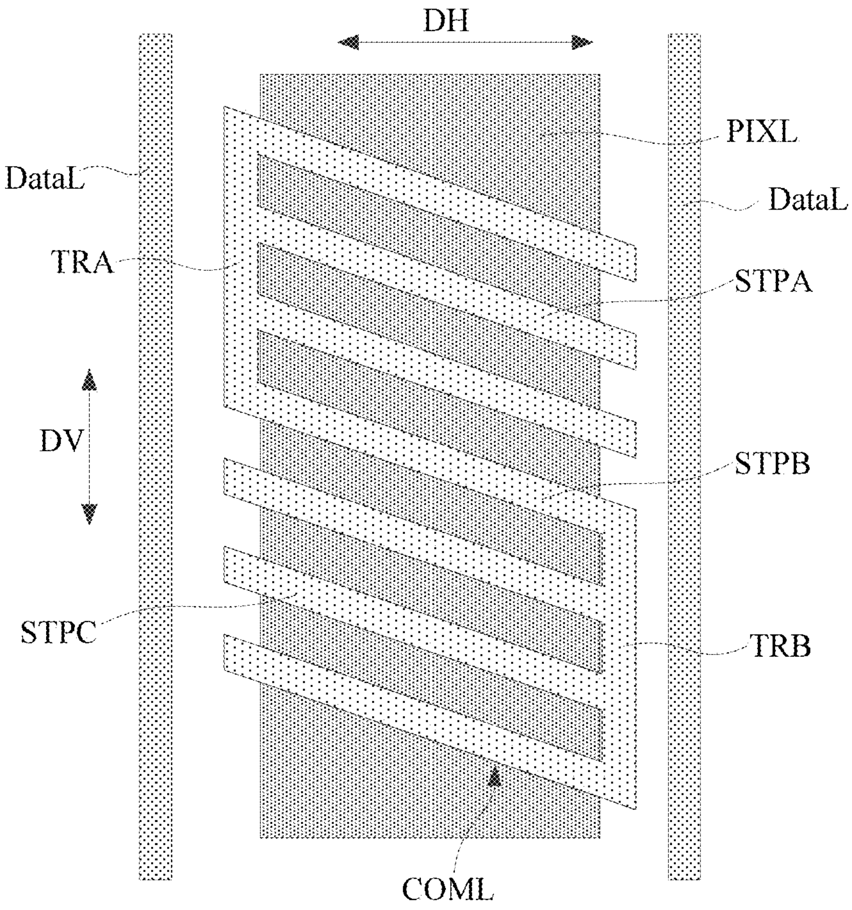
FIG. 6 is a schematic diagram of a partial top view structure of an array substrate in an embodiment of the present disclosure, in which the upper electrode is a common electrode.

Referring to FIGS. 2, 3, 5 and 6, the array substrate ARR may include a base substrate BP, a first electrode layer PIXA, an insulating layer PVX, and a second electrode layer PIXB, which are sequentially stacked, where the first electrode layer PIXA is provided with a lower electrode and the second electrode layer PIXB is provided with an upper electrode matching with the lower electrode. Wherein one of the lower electrode and the upper electrode is a pixel electrode and the other is a common electrode. The lower electrode is a whole surface electrode and the upper electrode is a slit electrode. In this way, a fringing electric field is generated between the lower electrode and the upper electrode to control the deflection of the liquid crystal molecules in the negative liquid crystal composition when driving the liquid crystal display panel. Referring to FIGS. 3 and 6, the slit electrode is a "丰" electrode. On both sides of the row direction DH of the pixel area where the lower electrode and the upper electrode are located, a data routing DataL is provided to load a drive voltage to the pixel electrode via a pixel drive circuit (e.g. a drive transistor). The upper electrode includes a plurality of parallel electrode strips, including a plurality of first electrode strips STPA, at least one second electrode strip STPB, and a plurality of third electrode strips STPC sequentially disposed along the column direction DV; the upper electrode further includes a first connecting sub-electrode TRA and a second connecting sub-electrode TRB located on both sides of the row direction of the upper electrode. One end of each first electrode strip STPA and one end of each second electrode strip STPB are connected to the first connecting sub-electrode TRA; one end of each third electrode strip STPC and the other end of each second electrode strip STPB are connected to the second connecting sub-electrode TRB. In this way, the slit between each first electrode strip STPA is closed at one end near the first connecting sub-electrode TRA, and open at one end away from the first connecting sub-electrode TRA; the slit between each third electrode strip STPC is closed at one end near the second connecting sub-electrode TRB and open at one end away from the second connecting sub-electrode TRB. This design approach can reduce the influence of the fringing electric field formed by the first connecting sub-electrode TRA and the second connecting sub-electrode TRB on the liquid crystal arrangement, thereby improving the transmittance of the liquid crystal display panel. In some tests, it was found that the transmittance of pixel areas can be increased by 15% to 25%.

In an example, the first connecting sub-electrode TRA and the second connecting sub-electrode TRB are both set parallel to the adjacent data routing DataL.

In an example, the orthographic projection of the pixel electrode on the base substrate BP is located within the orthographic projection of the common electrode on the base substrate BP. Furthermore, the upper electrode is a pixel electrode and the lower electrode is a common electrode. In this way, compared to the common electrode, the pixel electrode shrinks inward in the row direction. The common electrode can shield the electric field between the pixel electrode and the data routing DataL, thereby reducing or eliminating the light leakage in the area between the pixel electrode and the data routing DataL, and reducing or eliminating black and white image crosstalk.

In an example, the electrode strip is set to tilt along the row direction. Specifically, the angle between the electrode strip and the row direction (acute angle) is smaller than the angle between the electrode strip and the column direction (acute angle). Furthermore, the angle between the electrode strip and the row direction should be within the range of 3-15°.

In an example, the pre-tilt angle of the alignment layer may not exceed 0.68°, and the upper electrode adopts the above-mentioned "丰" shaped electrode. In this way, the alignment layer has a lower pre-tilt angle, which can reduce the AC residual image generated by alignment deviation; the upper electrode adopts a "丰" shaped electrode, which can improve the transparency of the liquid crystal display panel, and the two work together to achieve better display quality.

In some embodiments of the present disclosure, the display quality of the liquid crystal display panel can be further improved by asymmetric voltage compensation when driving the liquid crystal display panel. The optimal compensation voltage can be obtained through testing. It can be understood that different pixel electrode structures and materials of the alignment layer can lead to changes in the optimal compensation voltage.

In an embodiment of the present disclosure, the positive and negative voltages can be kept constant, and then the positive and negative voltage values can be gradually increased or decreased, while observing the residual image results for 2 hours; based on the residual image results, determine the compensation voltage of the liquid crystal display panel. Table 5 shows 2 hours residual image grades when using different 255 gray scale (maximum gray scale) positive voltage and 255 gray scale negative voltages to drive the liquid crystal display panel in a demonstration test example.

TABLE 5

| Residual image grades for different combinations of positive and negative voltages | | |
|---|---|---|
| 255 Grey Scale Positive Voltage/V | 255 Grey Scale Negative Voltage/V | 2 h Residual Image Grade |
| 5.4 | 5.2 | 3 |
| 5.3 | 5.3 | 2.5 |
| 5.2 | 5.4 | 2 |
| 5.1 | 5.5 | 1.5 |
| 5 | 5.6 | 1 |
| 4.9 | 5.7 | 2 |

According to the demonstration test results shown in Table 5, it can be seen that when different compensation voltages are used to drive the liquid crystal display panel with a certain structure and material of the liquid crystal display panel, the residual image effect presented by the liquid crystal display panel has obvious differences.

Table 6 shows the adapted compensation voltages and the residual image effects that can be achieved when the maximum resistivity of the alignment layer (e.g., the resistivity of the second sub-film layer, PIB) is different in a demonstration test example.

TABLE 6

| Residual image grades for different maximum resistivity of the alignment layers | | | | |
|---|---|---|---|---|
| Resistivity/(Ω · cm) | Compensation Voltage/V | 2 h Residual Image Grade | 4 h Residual Image Grade | 8 h Residual Image Grade |
| $10^{12}$ | −0.1 | 1 | 1 | 1 |
| $10^{13}$ | −0.2 | 1 | 1.5 | 2 |
| $10^{15}$ | −0.3 | 1.5 | 2 | 3 |

According to Table 6, it can be seen that the smaller the maximum resistivity of the alignment layer is, the larger the compensation voltage (the smaller the absolute value) is for the liquid crystal display panel; the smaller the residual image grade can be achieved, the more obvious the improvement of the residual image is.

Table 7 shows the voltage compensation values and residual image effects achieved for different pixel electrode structures in another demonstration test example.

TABLE 7

| Residual image grades with different pixel electrode structures | | |
|---|---|---|
| Pixel Electrode Structure | Compensation Voltage/V | 2 h Residual Image Grade |
| the upper electrode is a common electrode | −0.3 | 1.5 |
| the lower electrode is a common electrode | 0.3 | 1.5 |

According to Table 7, it can be seen that when the upper electrode is a common electrode, the compensation voltage is-0.3V, while when the current electrode is a common electrode, the compensation voltage is 0.3V. Whether the upper electrode is a common electrode or a pixel electrode, the residual image grades that liquid crystal display panels can achieve are basically the same.

The present disclosure also provides a liquid crystal display device, which includes any one of the liquid crystal display panels described in the above embodiments. The liquid crystal display device can be a television screen, outdoor advertising screen, monitor screen, smartphone screen, or other types of display devices. Due to the fact that the liquid crystal display device has any of the liquid crystal display panels described in the above embodiments, it has the same beneficial effect, and the disclosure will not be repeated here.

Other embodiments of the present disclosure will be apparent to those skilled in the art from consideration of the specification and practice of the present disclosure of the present disclosure. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

What is claimed is:

1. A liquid crystal display panel, comprising an array substrate and a color film substrate which are cell-assembled, and a liquid crystal layer disposed between the array substrate and the color film substrate;

wherein the liquid crystal layer comprises a negative liquid crystal composition; the total mass content of monomers containing dibenzothiophene structure and monomers containing dibenzofuran structure in the negative liquid crystal composition is not more than 2%;

wherein the negative liquid crystal composition comprises monomers shown by Chemical Formulae 1 and Chemical Formula 2:

Chemical Formula 1

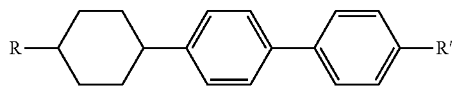

Chemical Formula 2

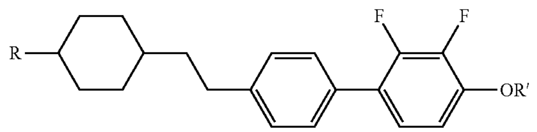

wherein R and R' of any one monomer are each independently selected from alkyl with 1 to 7 carbon atoms, fluorine-substituted alkyl with 1 to 7 carbon atoms, alkenyl with 3 to 10 carbon atoms, oxacycloalkyl with 4 to 10 carbon atoms, alkyl-substituted oxacycloalkyl with 4 to 10 carbon atoms, aryl with 6 to 10 carbon atoms, and alkyl-substituted aryl with 7 to 15 carbon atoms;

wherein the total mass content of the two monomers shown by Chemical Formula 1 and Chemical Formula 2 is from 13% to 20%.

2. The liquid crystal display panel according to claim 1, wherein the negative liquid crystal composition does not comprise monomers containing dibenzothiophene structure or monomers containing dibenzofuran structure.

3. The liquid crystal display panel according to claim 1, wherein a mass content of negative monomers in the negative liquid crystal composition is from 35% to 50%.

4. The liquid crystal display panel according to claim 1, wherein the negative liquid crystal composition further comprises an antioxidant, and the mass content of the antioxidant is from 0.1% to 0.5%.

5. The liquid crystal display panel according to claim 1, wherein the negative liquid crystal composition further comprises a light stabilizer and the mass content of the light stabilizer is from 0.1% to 0.5%.

6. The liquid crystal display panel according to claim 1, wherein R, R' of any one monomer are each independently selected from methyl, ethyl, propyl, isopropyl, butyl, tert-butyl, isobutyl, pentyl, hexyl, cyclopentyl, cyclohexyl, trifluoromethyl, propen-1-yl, 2-propenyl, 1,2-butadienyl, butylene1-1-yl, 3-buten-1-yl, 3-pentenyl, hexylvinyl, hexylbutenyl, p-tolyl, 1,3-dioxane-2-yl, 5-pentyl-1,3-dioxane-2-yl, 5-butyl-1,3-dioxane-2-yl, 5-(4-propylcyclohexan-1-yl)-1,3-dioxane-2-yl, 5-propyl-1-oxane-2-yl, 5-ethyl-1-oxane-2-yl.

7. The liquid crystal display panel according to claim 1, wherein the negative liquid crystal composition comprises monomers shown by the following chemical structures:

| Chemical Structure of Monomer | Mass Content of Monomer (%) |
|---|---|
| 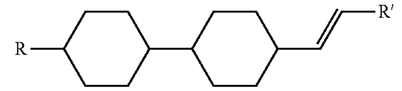 | 35%~45% |
| 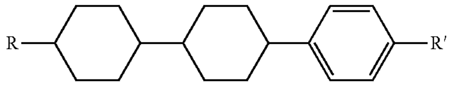 | 8%~14% |
| 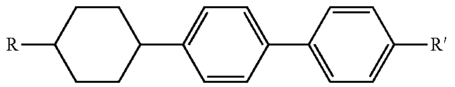 | 4%~8% |
| 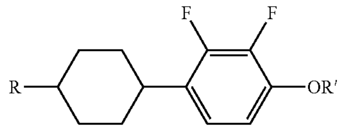 | 14%~23% |
| 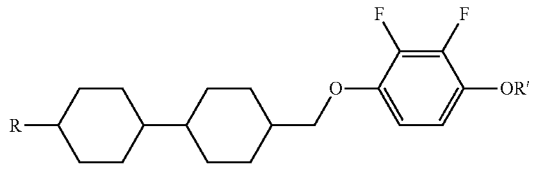 | 10%~18% |
| 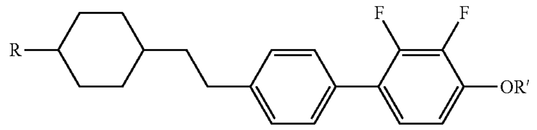 | 5%~13% |

wherein R and R' of any one monomer are each independently selected from alkyl with 1 to 7 carbon atoms, fluorine-substituted alkyl with 1 to 7 carbon atoms, alkenyl with 3 to 10 carbon atoms, oxacycloalkyl with 4 to 10 carbon atoms, alkyl-substituted oxacycloalkyl with 4 to 10 carbon atoms, aryl with 6 to 10 carbon atoms, and alkyl-substituted aryl with 7 to 15 carbon atoms.

8. The liquid crystal display panel according to claim 1, wherein the array substrate further comprises an alignment layer; the alignment layer comprises a first sub-film layer, a second sub-film layer, and a third sub-film layer which are sequentially stacked; the third sub-film layer is disposed adjacent to the liquid crystal layer;

the resistivity of the second sub-film layer is less than the resistivity of the third sub-film layer, and the resistivity of the first sub-film layer is greater than the resistivity of the second sub-film layer.

9. The liquid crystal display panel according to claim 8, wherein the first sub-film layer has a resistivity of greater than $10^{15}\Omega\cdot cm$.

10. The liquid crystal display panel according to claim 1, wherein the array substrate further comprises an alignment layer;

the alignment layer has a pre-tilt angle of no more than 0.68°.

11. The liquid crystal display panel according to claim 1, wherein the array substrate further comprises an alignment layer; the alignment layer comprises a hindered amine light stabilizer.

12. The liquid crystal display panel according to claim 1, wherein the array substrate further comprises an alignment layer; the surface of the alignment layer is provided with alignment grooves for constraining the alignment direction of a liquid crystals.

13. The liquid crystal display panel according to claim 1, wherein the array substrate and the color film substrate are respectively provided with alignment layers;

the alignment layer of the array substrate is formed by rubbing alignment with a cotton cloth;

the alignment layer of the color film substrate is formed by rubbing alignment with a nylon cloth.

14. The liquid crystal display panel according to claim 1, wherein the array substrate comprises a base substrate, a first electrode layer, an insulating layer, and a second electrode layer which are sequentially stacked;

wherein the first electrode layer is provided with a lower electrode and the second electrode layer is provided with an upper electrode matching with the lower electrode; one of the upper electrode and the lower electrode is a pixel electrode and the other is a common electrode;

the upper electrode is a slit electrode.

15. The liquid crystal display panel according to claim 14, wherein the upper electrode comprises a first connecting sub-electrode, a second connecting sub-electrode and a plurality of electrode strips disposed in parallel;

the plurality of electrode strips comprises a plurality of first electrode strips, at least one second electrode strip and a plurality of third electrode strips sequentially disposed in the column direction; the first connecting sub-electrode and the second connecting sub-electrode are respectively disposed on both sides of the upper electrode in the row direction;

wherein one end of each the first electrode strip and one end of each the second electrode strip are connected to the first connecting sub-electrode; one end of each the third electrode strip and the other end of each the second electrode strip are connected to the second connecting sub-electrode.

16. The liquid crystal display panel according to claim 15, wherein the array substrate further comprises data routings extending in the column direction; the first connecting sub-electrode is disposed in parallel with the adjacent data routing; the second connecting sub-electrode is disposed in parallel with the adjacent data routing.

17. The liquid crystal display panel according to claim 15, wherein the upper electrode is a pixel electrode and the lower electrode is a common electrode;

the orthographic projection of the pixel electrode on the base substrate is located within the orthographic projection of the common electrode on the base substrate.

18. A liquid crystal display device comprising the liquid crystal display panels comprising an array substrate and a color film substrate which are cell-assembled, and a liquid crystal layer disposed between the array substrate and the color film substrate;

wherein the liquid crystal layer comprises a negative liquid crystal composition; the total mass content of monomers containing dibenzothiophene structure and monomers containing dibenzofuran structure in the negative liquid crystal composition is not more than 2%;

wherein the negative liquid crystal composition comprises monomers shown by Chemical Formulae 1 and Chemical Formula 2;

Chemical Formula 1

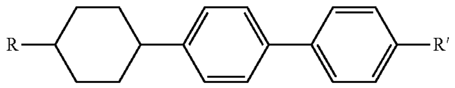

Chemical Formula 2

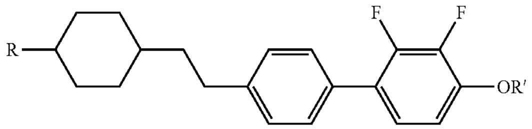

wherein R and R' of any one monomer are each independently selected from alkyl with 1 to 7 carbon atoms, fluorine-substituted alkyl with 1 to 7 carbon atoms, alkenyl with 3 to 10 carbon atoms, oxacycloalkyl with 4 to 10 carbon atoms, alkyl-substituted oxacycloalkyl with 4 to 10 carbon atoms, aryl with 6 to 10 carbon atoms, and alkyl-substituted aryl with 7 to 15 carbon atoms;

wherein the total mass content of the two monomers shown by Chemical Formula 1 and Chemical Formula 2 is from 13% to 20%.

* * * * *